US012562609B2

(12) United States Patent
Steingass et al.

(10) Patent No.: US 12,562,609 B2
(45) Date of Patent: Feb. 24, 2026

(54) ROTOR FOR AN AXIAL FLUX MOTOR

(71) Applicant: BorgWarner Inc., Auburn Hills, MI (US)

(72) Inventors: Patrick Steingass, Alzey (DE); Frank Haase, Markdorf (DE)

(73) Assignee: BorgWarner, Inc., Auburn Hills, MI (US)

( * ) Notice: Subject to any disclaimer, the term of this patent is extended or adjusted under 35 U.S.C. 154(b) by 62 days.

(21) Appl. No.: 18/119,423

(22) Filed: Mar. 9, 2023

(65) Prior Publication Data

US 2024/0258853 A1    Aug. 1, 2024

(30) Foreign Application Priority Data

Jan. 26, 2023    (DE) ..................... 10 2023 200 649.9

(51) Int. Cl.
| | |
|---|---|
| *H02K 1/2796* | (2022.01) |
| *F04D 25/06* | (2006.01) |
| *H02K 15/03* | (2006.01) |
| *H02K 21/24* | (2006.01) |

(52) U.S. Cl.
CPC ....... *H02K 1/2796* (2022.01); *F04D 25/0606* (2013.01); *H02K 15/03* (2013.01); *H02K 21/24* (2013.01)

(58) Field of Classification Search
CPC .. H02K 1/2796; H02K 1/2793; H02K 1/2795; H02K 21/24; H02K 15/12
See application file for complete search history.

(56) References Cited

U.S. PATENT DOCUMENTS

| | | | | |
|---|---|---|---|---|
| 6,394,094 | B1 * | 5/2002 | McKenna ........... | B29C 45/1643 |
| | | | | 128/830 |
| 2022/0255379 | A1 * | 8/2022 | Rossi ..................... | H02K 15/03 |
| 2022/0416622 | A1 * | 12/2022 | Echle ...................... | H02K 1/32 |
| 2023/0347088 | A1 * | 11/2023 | Spayne ............... | B29C 44/0461 |

(Continued)

FOREIGN PATENT DOCUMENTS

| | | |
|---|---|---|
| CN | 105871118 A | 8/2016 |

OTHER PUBLICATIONS

German Search Report issued on Jan. 15, 2024, in German Application No. DE 10 2023 200 649.9.

*Primary Examiner* — Oluseye Iwarere
*Assistant Examiner* — Masoud Vaziri
(74) *Attorney, Agent, or Firm* — Patent Central LLC; Stephan A. Pendorf

(57) ABSTRACT

A rotor for an axial flux motor with a disk-shaped rotor plate, a plurality of permanent magnets and a holding structure. The disk-shaped rotor plate has a plurality of magnet receptacles, which are distributed in the circumferential direction and introduced into the rotor plate in the axial direction. The magnet receptacles are each defined by four inner side surfaces of the rotor plate. The plurality of permanent magnets are arranged in the magnet receptacles and are each defined by four outer side surfaces. A first groove is introduced into at least one of the inner side surfaces, and a second groove is introduced into at least one of the outer side surfaces. The first and the second groove are arranged and formed in such a way that they jointly form a channel portion in which the holding structure for fixing the permanent magnets in the rotor plate is arranged.

20 Claims, 9 Drawing Sheets

(56)         References Cited

U.S. PATENT DOCUMENTS

| 2024/0204593 | A1* | 6/2024 | Gilliam | H02K 1/246 |
| 2024/0204597 | A1* | 6/2024 | Schmolke | H02K 1/2793 |
| 2024/0348133 | A1* | 10/2024 | Fleurisson | H02K 21/24 |

* cited by examiner

A-A

C-C

B-B

C-C

ROTOR FOR AN AXIAL FLUX MOTOR

TECHNICAL FIELD

The present invention relates to a rotor for an axial flux motor and to a corresponding production method. In particular, the invention relates to an axial flux motor having a rotor of this kind and to a high-voltage fan having a corresponding axial flux motor.

BACKGROUND

Electric machines have long been used for the production of kinetic energy in many technical fields. An electric machine (also called an electric motor or E-motor) is an electric device that can convert electrical energy into mechanical energy. The mechanical energy can in turn be used to generate kinetic energy, with which other devices can be driven. Here, the electric motor generally comprises a stator and a rotor, which are accommodated in a motor housing. In many applications, the stator is fixed in position and the rotor moves relative to the stator and is usually seated on a drive shaft that rotates together with the rotor. The rotational energy can be transmitted to other devices via the shaft. Most electric motors generate energy with a magnetic field and a winding current.

In principle, it is possible to draw a distinction between radial flux machines and axial flux machines:

In radial flux machines, the rotor generally consists of a cylindrical body, the entire circumference of which carries magnets. The stator is generally of hollow-cylindrical design and surrounds the rotor at a radial distance. On its inner side, the stator carries a plurality of circumferentially distributed winding elements. Each winding element in each case comprises a stator tooth, which extends in the radial direction from a stator yoke toward the rotor. The stator tooth is wound with a wire consisting of a metallic, highly conductive material in order to form the winding. When current is applied to the windings, the rotor, which is attached to the output shaft of the motor, is subjected to a torque resulting from the magnetic field, wherein the generated magnetic flux in a radial flux machine is a radial flux.

In axial flux machines, the rotor generally consists of a disk-shaped rotor body with two circular surfaces that are connected by a thickness, wherein the disk is delimited by an outer collar and an inner circumference that delimits a space for a rotating shaft. Normally, at least two permanent magnets are attached to at least one of the two circular surfaces of the rotor body, this being referred to as a supporting surface. The stator is generally of disk-shaped configuration and is arranged in a fixed manner at an axial distance from the rotor. On its side facing the rotor, the stator carries a plurality of circumferentially distributed winding elements. Each winding element in each case comprises a stator tooth, which extends in the axial direction from a stator yoke toward the rotor. The stator tooth is wound with a wire consisting of a metallic, highly conductive material in order to form the winding. When current is applied to the windings, the rotor, which is attached to the output shaft of the motor, is subjected to a torque resulting from the magnetic field, wherein the generated magnetic flux in an axial flux machine is an axial flux. In axial flux machines, the rotor and the stator are spaced apart in the axial direction by an axial gap and are therefore also frequently referred to as axial gap machines. The rotor of an axial flux machine can be driven by a stator on one side of the rotor or by two stators on both sides of the rotor. In the case of a rotor having a single air gap, which is intended to be operated with a single stator, the magnets are often carried by a single circular surface of the rotor body. In the case of a rotor having two air gaps, which is intended to be operated with two stators, the magnets are often carried by both circular surfaces. The magnets are in each case held on the circular surface by holding means, a distance being left between the at least two magnets on the same surface. In both variants, the same magnets can also be held in the rotor body in such a way that they rest flush against one or both circular surfaces. This can be achieved, for example, by means of pockets or windows for receiving the magnets, which are axially recessed into one or both circular surfaces or are designed to pass axially through these surfaces. In this case, there is a challenge in the fixing of the permanent magnets.

The continuous further development of electric motors and the trend toward the use of electric current as an energy carrier and source is leading to a continuous expansion of the application portfolio of electric motors. Electric motors are used not only in small electronic devices such as notebooks (e.g. mechanical hard drive or Blu-ray player) or household appliances, which are usually operated in the low-voltage range. Increasingly, electric motors in larger dimensions are also being used in the high-voltage range at operating voltages of up to 800 volts and more.

Electric motors, especially in high-voltage applications, generally generate heat during operation. During operation of an axial flux motor, the magnetic forces may, in addition to providing the torque, urge the permanent magnets in the axial direction. As a result, there is the risk that the rotor will tend to bend axially toward the stator, which in the worst case can lead to the rotor touching the stator. There is also the risk that the permanent magnets will become detached from the rotor as a result of the strong axial forces. Ultimately, this can lead to failure or damage of the axial flux motor. A further challenge is the reduction of the eddy current losses of the rotor, especially if it comprises metallic materials. Rotor eddy current losses can lead to an increase in the rotor temperature, impair the efficiency of motor performance and even lead to demagnetization of the permanent magnet.

It is the object of the present invention to provide a more reliable rotor for an axial flux motor having a compact design and improved eddy current properties.

SUMMARY OF THE INVENTION

The present invention relates to a rotor for an axial flux motor as claimed in claim 1. Furthermore, the invention relates to an axial flux motor having such a rotor as claimed in claim 13, and to a high-voltage fan having a corresponding axial flux motor as claimed in claim 14. Moreover, the invention relates to a production method for a rotor as claimed in claim 15.

The rotor according to the invention for an axial flux motor comprises a disk-shaped rotor plate, a plurality of permanent magnets and a holding structure. The disk-shaped rotor plate comprises a plurality of magnet receptacles, which are distributed in the circumferential direction and introduced into the rotor plate in the axial direction. The magnet receptacles are each defined by four inner side surfaces of the rotor plate. The plurality of permanent magnets are arranged in the magnet receptacles and are each defined by four outer side surfaces. A first groove is introduced into at least one of the inner side surfaces. A second groove is introduced into at least one of the outer side surfaces. The first and the second groove are arranged and designed in such a way that they jointly form a channel portion in which a holding structure for fixing the permanent magnets in the rotor plate is arranged. The channel portion can, in particular, be designed as a cavity. By means of the channel portion jointly formed by the permanent magnet and the rotor plate and of the holding structure arranged therein, secure fixing of the permanent magnets can be provided, particularly in the axial direction. In particular, there is the possibility of producing the holding structure from a different material and/or with different structural properties than the disk-shaped rotor plate. For example, the disk-shaped rotor plate can be designed with a higher stiffness than the holding structure. Moreover, there is the possibility of providing the holding structure independently and/or at a different time in the production method than the disk-shaped rotor plate. For example, an adhesive and/or thermoplastic material can be poured into the channel portion. In particular, a rotor having improved creep resistance and improved temperature stability, as well as higher stiffness, can be provided. Moreover, it is possible to dispense with metallic structure-stiffening materials. In comparison with a rotor which has metallic materials in the magnetic region, eddy current losses can be avoided or at least reduced. Moreover, the rotor can contribute to a reduction in the number of parts in that an otherwise frequently additionally necessary metallic carrier element which is seated on the shaft can be omitted.

In refinements of the rotor, the rotor plate can have a first axial surface, a second, opposite axial surface and an axial thickness therebetween. In refinements, the magnet receptacles can be recessed into the first axial surface and/or into the second axial surface in the axial direction. In particular, the magnet receptacles can be designed as through-windows. In other words, the magnet receptacles can extend through the entire axial thickness of the rotor plate, i.e. have openings at both axial surfaces.

In refinements that can be combined with any one of the preceding refinements, the first groove can be at a distance from the first axial surface and the second axial surface. In refinements, the first groove can be arranged axially centrally between the first axial surface and the second axial surface. It is thereby possible to enable fixing of the permanent magnets in both axial directions by means of just one groove. Moreover, the stiffness of the rotor can be improved compared to a groove which is not axially central.

In refinements which can be combined with any one of the preceding refinements, the rotor plate can have a substantially constant axial thickness. In refinements, the rotor plate can be manufactured from a plate material. Manufacturability can thereby be substantially simplified. In refinements, the plate material can have a preset axial thickness. The preset axial thickness of the plate material can correspond to the axial thickness of the disk-shaped rotor plate.

In refinements which can be combined with any one of the preceding refinements, the permanent magnets can each have a first axial magnet surface, a second axial magnet surface, and an axial magnet thickness therebetween. In refinements, the second groove can be at a distance from the first axial magnet surface and the second axial magnet surface. In refinements, the first groove can be arranged axially centrally between the first axial magnet surface and the second axial magnet surface. It is thereby possible to enable fixing of the permanent magnets in both axial directions by means of just one groove. Moreover, the stiffness of the rotor can be improved compared to a groove which is not axially central. In refinements, the axial magnet thickness of the permanent magnets can substantially correspond to the axial thickness of the rotor plate.

In refinements which can be combined with any one of the preceding refinements, the permanent magnets can be magnetized in the axial direction.

In refinements which can be combined with any one of the preceding refinements, the permanent magnets can each be formed by a stack of magnetic plates which are stacked in the radial direction.

In refinements which can be combined with any one of the preceding refinements, the permanent magnets can have a trapezoidal shape in a plane which is defined by the radial direction and the circumferential direction.

In refinements which can be combined with any one of the preceding refinements, the four inner side surfaces of the magnet receptacles can comprise a radially outer side surface, a radially inner side surface, a first lateral side surface and a second lateral side surface. In refinements, the first groove can be introduced at least into the first lateral side surface and/or the second lateral side surface. The first groove can be recessed into the first lateral side surface and/or the second lateral side surface, in particular in the circumferential direction. The first groove can extend along the first lateral side surface and/or the second lateral side surface, in particular in the radial direction. In refinements, the first groove can be introduced at least into the radially outer side surface and/or into the radially inner side surface. The first groove can be recessed into the radially outer side surface and/or into the radially inner side surface, in particular in the radial direction. Depending on the configuration of the side surfaces, the first groove can extend along the radially outer side surface and/or the radially inner side surface, in particular in the circumferential direction and/or tangential direction. In refinements, the first groove can be designed as a peripheral groove. The first groove can be introduced into all four inner side surfaces.

In refinements which can be combined with any one of the preceding refinements, the four outer side surfaces of the permanent magnets can comprise a radially outer side surface, a radially inner side surface, a first lateral side surface and a second lateral side surface. In refinements, the second groove can be introduced at least into the first lateral side surface and/or the second lateral side surface. The second groove can be recessed into the first lateral side surface and/or the second lateral side surface, in particular in the circumferential direction. The second groove can extend along the first lateral side surface and/or the second lateral side surface, in particular in the radial direction. In refinements, the second groove can be introduced at least into the radially outer side surface and/or into the radially inner side surface. The second groove can be recessed into the radially outer side surface and/or into the radially inner side surface, in particular in the radial direction. Depending on the configuration of the side surfaces, the second groove can extend along the radially outer side surface and/or the radially inner side surface, in particular in the circumferential direction and/or tangential direction. In refinements, the second groove can also be configured as a peripheral groove.

In refinements that can be combined with any one of the preceding refinements, at least one of the four outer side surfaces of the permanent magnets can be in contact with at least one of the four inner side surfaces of the magnet receptacles.

In refinements that can be combined with any one of the preceding refinements, the first groove can be connected to at least one filling channel and/or one venting channel. The filling channel and/or the venting channel can be introduced into the rotor plate. In particular, the filling channel and/or the venting channel can comprise a radial bore and/or an axial bore. In refinements, the respective filling channels and/or venting channels can each have their own opening. In refinements, a plurality of filling channels can comprise a common opening. In refinements, a plurality of venting channels can comprise a common opening. In refinements, the filling channel and/or the venting channel can extend outward in the radial direction from the magnet receptacle, in particular as far as an outer circumference. In refinements, the holding structure can extend at least partially into the filling channel and/or the venting channel.

In refinements which can be combined with any one of the preceding refinements, the holding structure can be produced by pouring a filler into the channel portion.

In refinements which can be combined with any one of the preceding refinements, the holding structure can be produced by pouring a filler into the channel portion through the filling channel.

In refinements which can be combined with any one of the preceding refinements, the holding structure can be arranged in the channel portion in such a way that the permanent magnets are fixed in the rotor plate by the holding structure at least by positive engagement.

In refinements which can be combined with any one of the preceding refinements, the permanent magnets can be fixed axially by the holding structure.

In refinements which can be combined with any one of the preceding refinements, the rotor plate can be produced from a first material and the holding structure can be produced from a second material. In particular, the first material and/or the second material can be a non-metallic material. In refinements, the material and the second material can be different materials and/or can have different properties. In refinements, the first material can comprise a composite material. In particular, the first material can comprise a fiber-reinforced plastic material. In refinements, the second material can comprise a thermoplastic material.

In refinements which can be combined with any one of the preceding refinements, the rotor plate can have a central through hole.

In refinements which can be combined with any one of the preceding refinements, the rotor plate can have a plurality of shaft fastening holes. The shaft fastening holes can be arranged radially inwardly of the magnet receptacles. In refinements, the rotor can furthermore comprise a plurality of bushings. The plurality of bushings can be arranged in the shaft fastening holes. In particular, the plurality of bushings can be pressed into the shaft fastening holes. As an alternative or in addition to the bushings, one or more perforated disks can be provided.

The present invention furthermore relates to an axial flux motor for a fan, wherein the axial flux motor comprises a rotor in accordance with any one of the preceding refinements. Moreover, the axial flux motor comprises a motor housing, a shaft, and at least one stator. The shaft is rotatably mounted in the motor housing. The at least one stator is arranged in the motor housing. The at least one stator is arranged axially adjacent to the rotor in the motor housing. The rotor is arranged for conjoint rotation on the shaft and axially adjacent to the at least one stator in the motor housing. In particular, a gap in the axial direction is formed between the stator and the rotor.

In refinements of the axial flux motor, the axial flux motor can comprise two stators. The rotor can be arranged axially between the two stators. In refinements of the axial flux motor, the axial flux motor can comprise at least three stators and at least two rotors. In addition, the rotors can each be arranged between two stators.

In refinements of the axial flux motor, the axial flux motor can be designed as a high-voltage axial flux motor for a high-voltage fan. In particular, the axial flux motor can be designed as a high-voltage axial flux motor for a high-voltage fan of an electric vehicle.

The present invention furthermore relates to a high-voltage fan. The high-voltage fan comprises an axial flux motor in accordance with any one of the preceding refinements. Moreover, the high-voltage fan comprises a fan impeller. The fan impeller is arranged for conjoint rotation on the shaft, outside of the motor housing.

The present invention furthermore relates to a method for producing a rotor for an axial flux motor. The method comprises the following steps. Providing a disk-shaped rotor plate having a plurality of magnet receptacles, wherein a first groove is introduced into each of the magnet receptacles. Providing a plurality of permanent magnets into each of which a second groove is introduced. Inserting a respective permanent magnet into a respective magnet receptacle in such a way that the first groove and the second groove jointly form a channel portion. Holding the permanent magnets in the magnet receptacles. Introducing a filler material into the channel portion, thereby forming a holding body for fixing the permanent magnets in the magnet receptacles.

In refinements of the method, the plurality of magnet receptacles can be introduced mechanically into the disk-shaped rotor plate. In particular, the plurality of magnet receptacles can be introduced into the disk-shaped rotor plate by machining (e.g. milling).

In refinements of the method, the plurality of magnet receptacles can be introduced axially as through-receptacles into the disk-shaped rotor plate.

In refinements of the method, the first groove can be introduced into the disk-shaped rotor plate mechanically. In particular, the first groove can be introduced into the disk-shaped rotor plate by machining (e.g. milling).

In refinements of the method, a filling channel and/or a venting channel can furthermore be introduced into the disk-shaped rotor plate. The filling channel and/or the venting channel can be fluidically connected to or brought into fluidic connection with the first groove. In refinements, the filling channel and/or the venting channel can be introduced mechanically into the disk-shaped rotor plate. In particular, the filling channel and/or the venting channel can be introduced into the disk-shaped rotor plate by machining. In some refinements, the filling channel and/or the venting channel can be introduced, by drilling for example, in the radial direction and/or in the axial direction, into the disk-shaped rotor plate. In refinements, the filler material can be introduced into the channel portion via the filling channel.

In refinements of the method, the filler material can be introduced into the channel portion under counterpressure. This makes it possible, in particular, to achieve a reduction in the shrinkage during cooling and, as a result, an increase in the filling factor in the channel portion.

In refinements of the method, the filler material can be poured or injected into the channel portion.

In refinements of the method, the filler material can comprise a thermoplastic material. After curing, the filler material can form the holding structure. Alternatively or in addition, the filler material can comprise adhesive material and/or fiber-reinforced material.

In refinements of the method, the permanent magnets can be held in the magnet receptacles during the introduction of the filler material. In refinements, the permanent magnets can be held axially in the magnet receptacles.

In refinements of the method, the rotor can be produced in accordance with any one of the preceding refinements.

BRIEF DESCRIPTION OF THE FIGURES

Further features can be seen from the accompanying drawings, which form part of this disclosure. The drawings are intended to further explain the present disclosure and to enable a person skilled in the art to put the present disclosure into practice. However, the drawings are to be understood as non-limiting examples. Common reference signs in various figures indicate identical or similar features.

DETAILED DESCRIPTION

Figure 1:
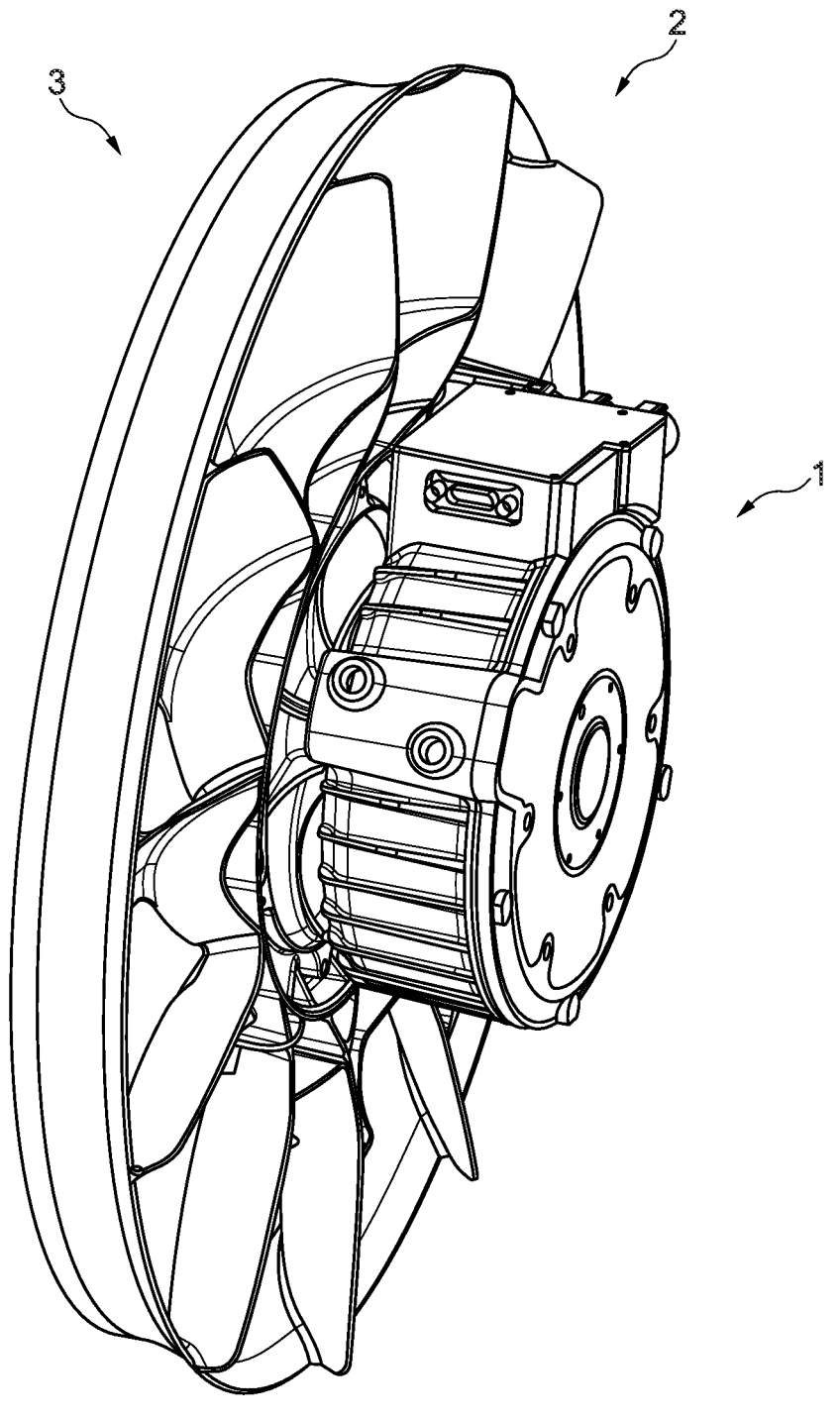
FIG. 1 shows a perspective illustration of the fan according to the invention having an axial flux motor.

Refinements of the rotor, the axial flux motor, the high-voltage fan, and the method according to the present disclosure are explained below with reference to the drawings.

In the context of this application, the terms axial or axial direction relate to an axis of rotation of the rotor 10 (and/or of the shaft 70 and/or of the axial flux motor 1). In the figures (see, for example, FIGS. 2 to 5b), the axial direction 22 of the rotor 10 is represented by the reference sign 22. The expression radial or radial direction is to be understood in relation to the axis/axial direction 22 of the rotor 10 and is denoted by the reference sign 24. Likewise, a circumference, circumferential or a circumferential direction relates to the axis/axial direction 22 of the rotor 10 and is identified by the reference sign 26. It should be understood that, although only a single illustrative direction is shown in each of the respective figures, the respective opposite direction also falls under the respective expression. Thus, for example, in FIG. 4a, the circumferential direction 26 is represented by an arrow oriented clockwise. However, a counterclockwise direction about the axis 22 can also be referred to as a circumferential direction 26. This also applies analogously to the axial direction 22 and the radial direction 24.

Figure 2:
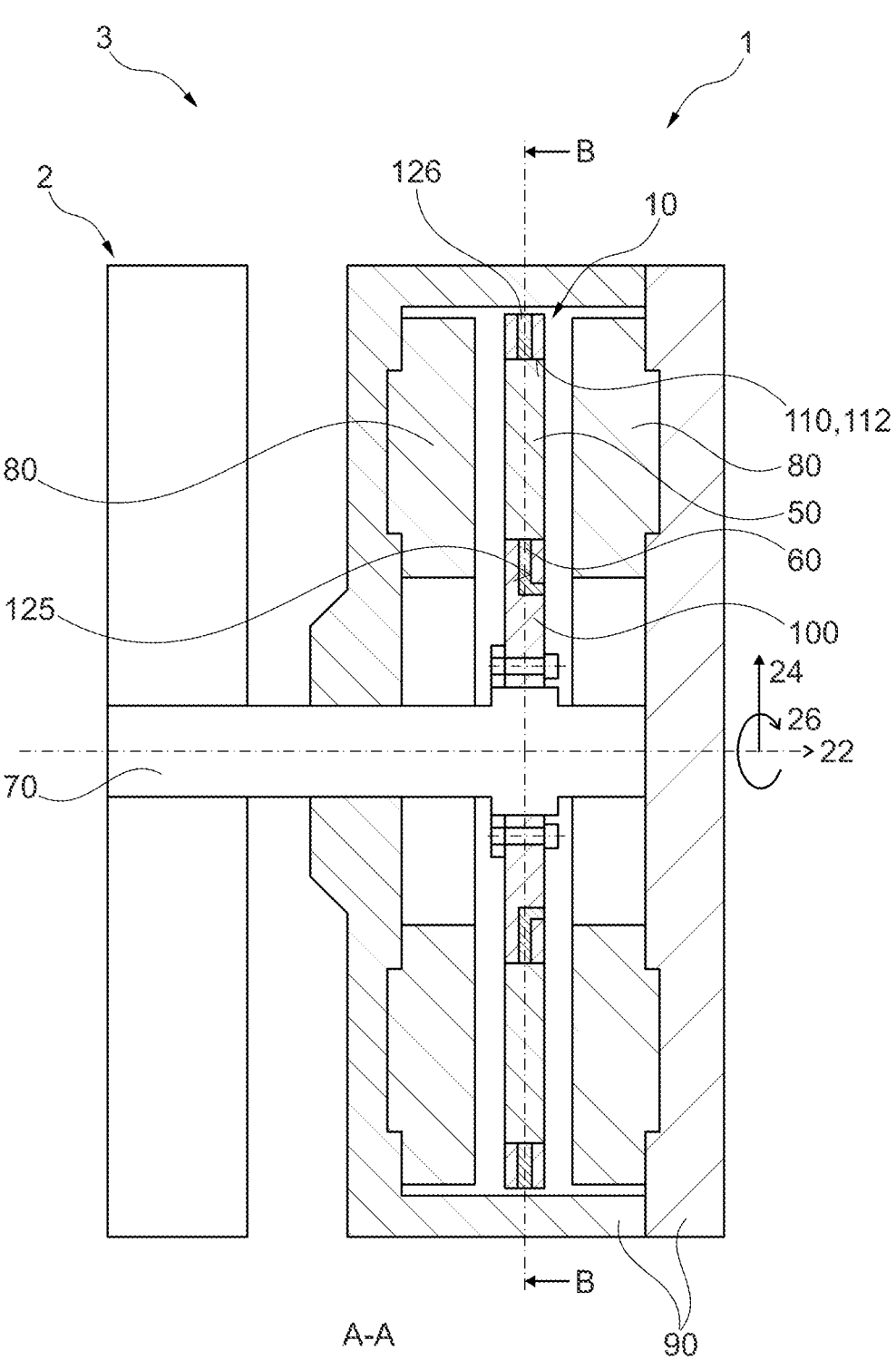
FIG. 2 shows a schematic sectional illustration of the fan along section A-A from FIG. 3 in an illustrative refinement having two stators.

FIGS. 1 and 2 illustrate an illustrative high-voltage fan 3 according to the present invention. The fan 3 comprises an axial flux motor 1 and a fan impeller 2. The fan impeller 2 can be driven by the axial flux motor 1. For this purpose, the fan impeller 2 is arranged for conjoint rotation on a shaft 70 of the axial flux motor 1, outside of a motor housing 90 of the axial flux motor 1 (see FIG. 2). In the perspective illustration of FIG. 1, only the motor housing 90 and the fan impeller 2 are visible for the sake of illustration. In embodiments, the high-voltage fan 3 can furthermore comprise a cooling device. In this regard, FIG. 1 illustrates cooling connections for supplying and discharging cooling fluid for cooling the axial flux motor. Moreover, electrical connections of the axial flux motor 1 are illustrated.

Figure 3:
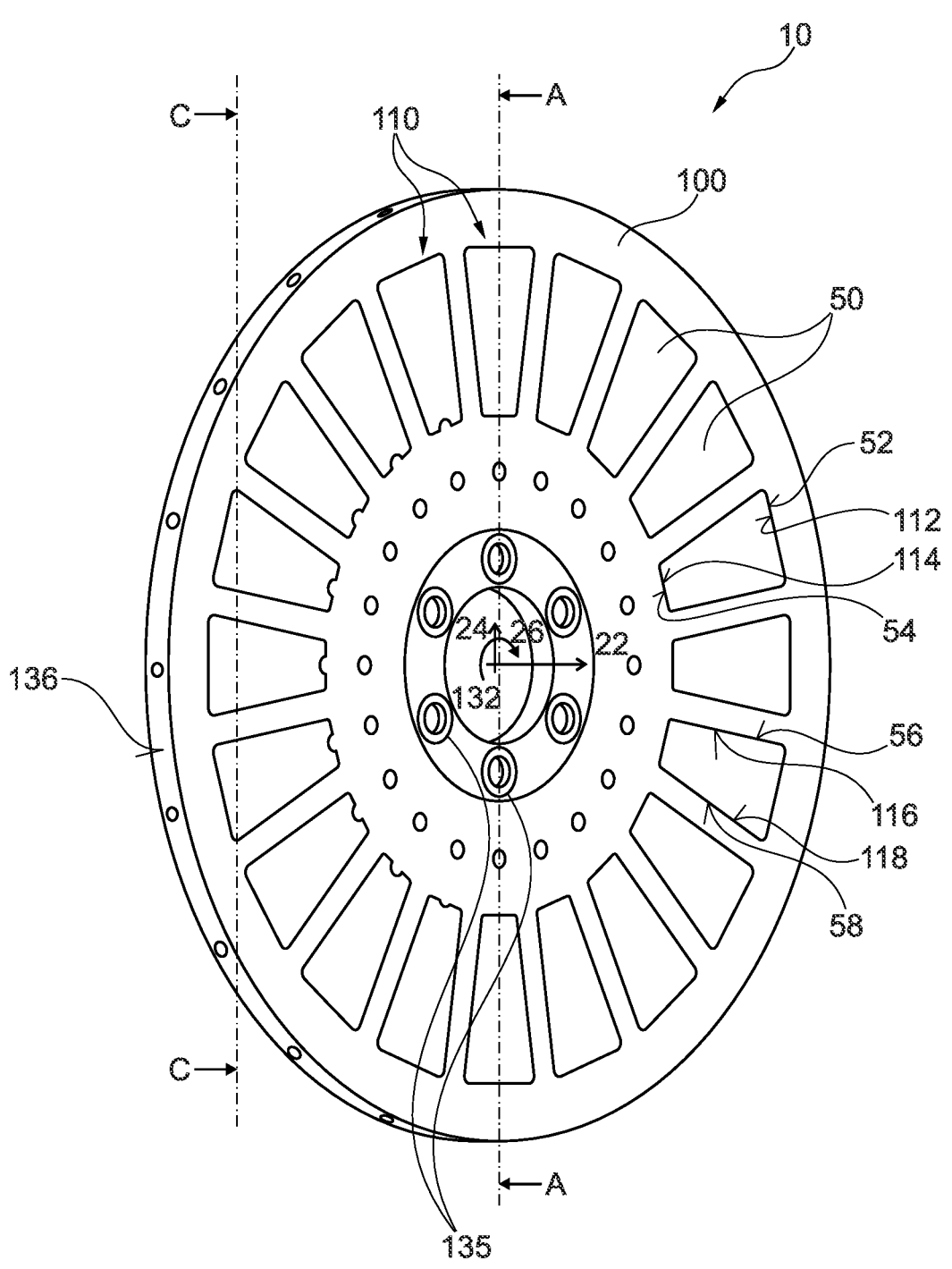
FIG. 3 shows a perspective illustration of the rotor.

FIG. 2 shows the high-voltage fan 3 in a schematically simplified sectional illustration along section line A-A of FIG. 3. In the illustrative embodiment, the axial flux motor 1 comprises a housing 90, a shaft 70, two stators 80, and a rotor 10 according to the present invention. In this refinement, the stators 80 are each arranged axially adjacent on either side of the rotor 10. The shaft 70 is rotatably mounted in the motor housing 90. The two stators 80 are arranged in a fixed manner in the motor housing 90. The rotor 10 is arranged for conjoint rotation on the shaft 70 and axially between the two stators 80. Thus, the rotor 10 rotates together with the shaft 70 in the motor housing 90, wherein the one or the two stators 80 drive the rotor 10. For this purpose, each of the stators 80 can have a ring-shaped stator yoke having a plurality of stator teeth (not illustrated in detail), which extend in the axial direction 22 from the stator yoke toward the rotor 10 while being distributed in the circumferential direction 26. The stators 80 or their stator teeth are wound with electrical leads (not illustrated) in order to form windings. The electrical leads can have a round (e.g. circular) cross section or some other cross section, for example a rectangular cross section. The windings can comprise multilayer windings. As already mentioned, FIG. 2 is a greatly simplified representation of the axial flux motor 1, and therefore the details, e.g. of the stators 80, cannot be seen in detail. When a drive current is applied to the windings, a magnetic field can be generated which is suitable for acting on and driving the rotor 10. An air gap is provided between the rotor 10 and the stators 80, this gap being clearly visible in FIG. 2. This air gap extends in the axial direction 22 and can also be referred to as an axial air gap. For illustration, the axial air gaps are shown greatly enlarged.

In some embodiments, a wall of the motor housing 90 adjacent to one or both stators 80 can have a cooling system. For example, a wall (e.g. the housing cover) of the housing 90 on the right-hand side of the right stator 80 in FIG. 2 can have a cooling system, e.g. a cooling channel with fluid cooling. In addition or as an alternative, a wall of the motor housing 90 on the left-hand side of the left stator 80 in FIG. 2 can have a cooling system, e.g. a cooling channel with fluid cooling. In some embodiments, the axial flux motor 1 can have just one stator on one axial side of the rotor 10. In other embodiments, the axial flux motor 1 can comprise more than one rotor 10 and/or more than two stators 80 (not illustrated). For example, the axial flux motor 1 can comprise at least three stators 80 and at least two rotors 10 (not illustrated). In addition, the rotors 10 can each be arranged between two stators 80.

The fan 3 according to the invention or its components are configured as a high-voltage fan 3. In particular, the axial flux motor 1 can be designed as a high-voltage axial flux motor 1. This means that the axial flux motor 1 is dimensioned for applications in the high-voltage range at operating voltages of up to 800 volts and more. The fan 3 can be used, in particular, for cooling components of an electric vehicle (for example a battery-operated electric vehicle, in particular a motor vehicle such as a passenger vehicle or a commercial vehicle). Alternatively, the fan 3 can also be used in other (in particular mobile) applications in which a high (cooling)

capacity is required. In particular, these also include applications with an electric motor and/or internal combustion engine. For example, the fan 3 can be used in applications with drive motors of a size similar to that of an electric vehicle. Such applications can also include, for example, machines or vehicles that have internal combustion engines and/or electric motors, such as construction machines, generators or cranes, to name just a few examples.

Figure 5A:
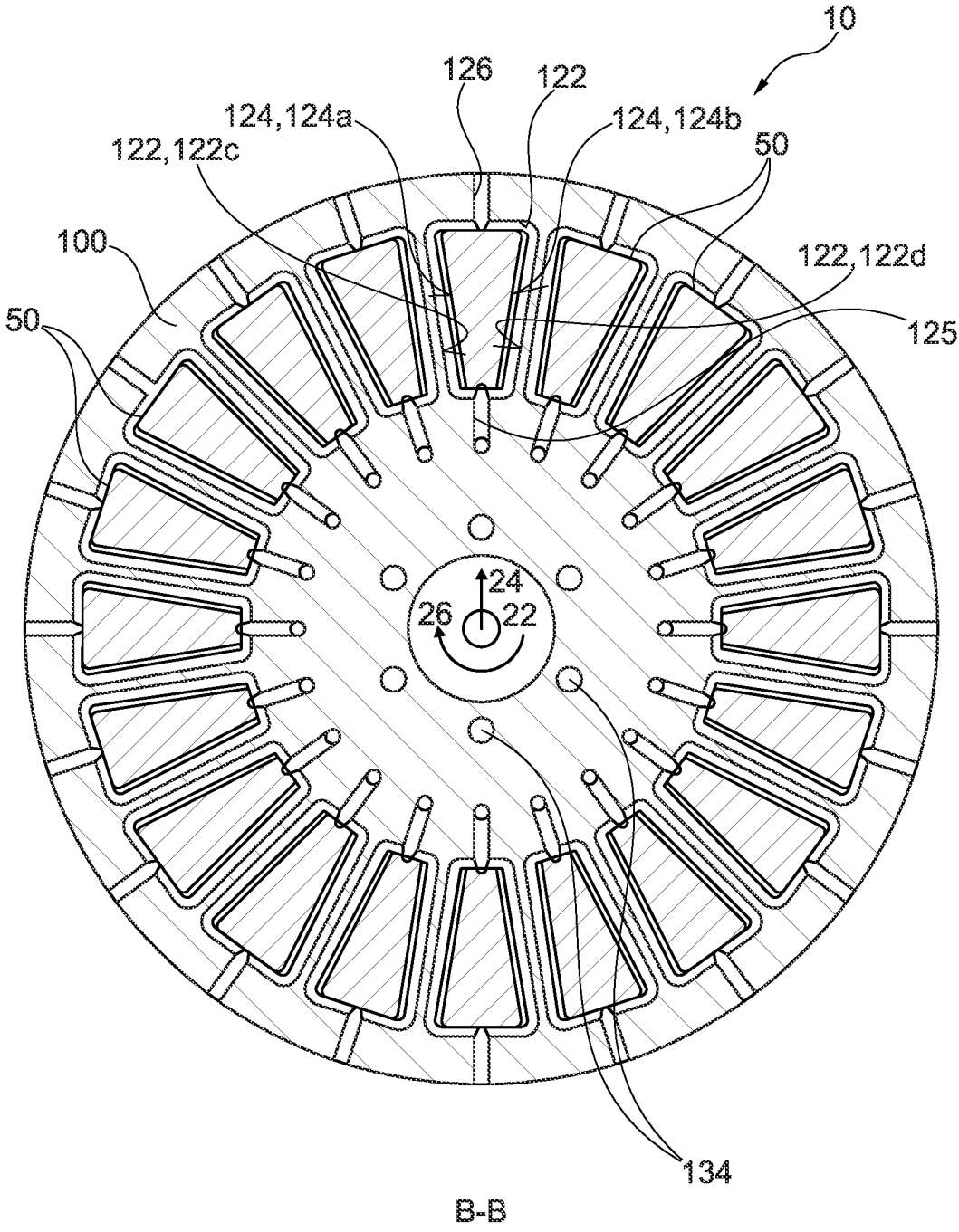
FIG. 5a shows the rotor without a holding structure in a sectional view along section B-B from FIG. 2.
Figure 5B:
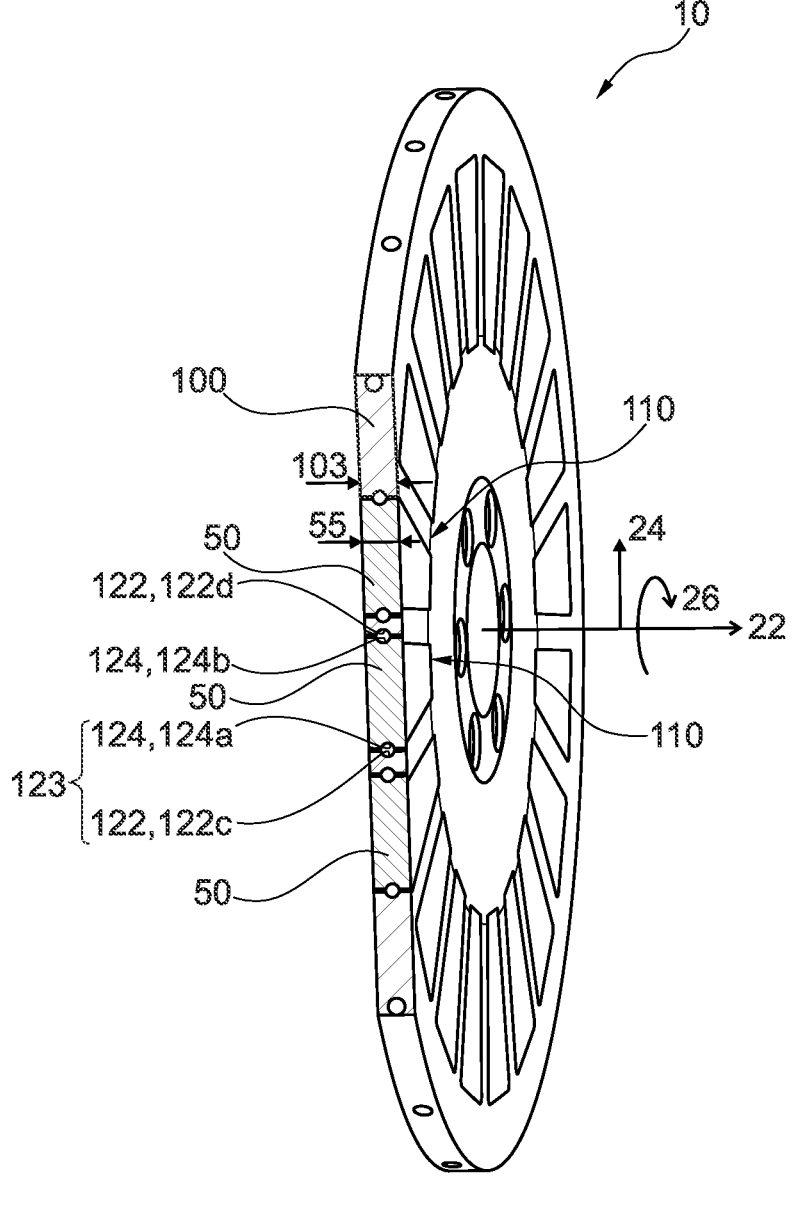
FIG. 5b shows the rotor from FIG. 5a in a sectional view along section C-C from FIG. 3.

With further reference to FIG. 2 as well as with reference to FIGS. 3, 5a and 5b, the rotor 10 according to the present invention can be seen in detail.

The rotor 10 comprises a disk-shaped rotor plate 100 (also referred to simply as a "rotor plate" 100 in the context of this disclosure), a plurality of permanent magnets 50 and a holding structure 60. The disk-shaped rotor plate 100 is also illustrated in detail in FIGS. 4a and 4b and comprises a plurality of magnet receptacles 110. The magnet receptacles 110 are distributed in the circumferential direction 26 and are introduced into the rotor plate 100 in the axial direction 22. The magnet receptacles 110 are defined by four inner side surfaces 112, 114, 116, 118 of the rotor plate 100 (see FIG. 4a). An illustrative permanent magnet is shown in detail in FIG. 6. The plurality of permanent magnets 50 are arranged in the magnet receptacles 110 and are each defined by four outer side surfaces 52, 54, 56, 58 (see especially FIGS. 3 and 6). A first groove 122 is introduced into at least one of the inner side surfaces 112, 114, 116, 118 (see FIGS. 4a to 5b). A second groove 124 is introduced into at least one of the outer side surfaces 52, 54, 56, 58. As is most clearly visible in FIGS. 5a and 5b, the first and the second groove 122, 124 are arranged and designed in such a way that they jointly form a channel portion 123 in which a holding structure 60 for fixing the permanent magnets 50 in the rotor plate 100 is arranged. The channel portion 123 can be designed, in particular, as a cavity in which the holding structure 60 is arranged.

In order to illustrate the grooves 122, 124 more clearly, the holding body 60 is hidden in FIGS. 5a and 5b for reasons of illustration. Nevertheless, it is understandable for a person skilled in the art that the holding body 60 of the rotor 10 disclosed here is situated at least partially in the channel portion 123. In particular, the holding body 60 can be arranged in the channel portion 123 in such a way that it is arranged both in the first groove 122 of the magnet receptacle 110 and in the second groove 124 of the permanent magnet 50 in order to provide a holding force between the rotor plate 100 and the permanent magnets 50. In particular, the holding structure 60 can be arranged in the channel portion 123 in such a way that the permanent magnets 50 are fixed in the rotor plate 100 by the holding structure 60 at least by positive engagement. In other words, the holding structure 60 establishes a positive connection with the respective permanent magnet 50 and with the rotor plate 100. In particular, the permanent magnets 50 can be fixed axially by the holding structure 60. In other words, the holding structure 60 is configured and arranged in the grooves in such a way as to secure the permanent magnets 50 axially.

By means of the channel portion 123 jointly formed by the permanent magnet 50 and the rotor plate 100 and of the holding structure 60 arranged therein, secure fixing of the permanent magnets 50 can be provided, particularly in the axial direction 22. In particular, there is the possibility of producing the holding structure 60 from a different material and/or with different structural properties than the disk-shaped rotor plate 100. For example, the disk-shaped rotor plate 100 can be designed with a higher stiffness than the holding structure 60. Moreover, there is the possibility of providing the holding structure 60 independently and/or at a different time in the production method than the disk-shaped rotor plate 100. For example, an adhesive and/or thermoplastic material can be poured into the channel portion 123. In particular, a rotor 10 having improved creep resistance and improved temperature stability, as well as higher stiffness, can be provided. Moreover, it is possible to dispense with metallic structure-stiffening materials. In comparison with a rotor which has metallic materials in the magnetic region, eddy current losses can be avoided or at least reduced. Moreover, the rotor 10 can contribute to a reduction in the number of parts, e.g. in that an otherwise frequently additionally necessary metallic carrier element which is seated on the shaft 70 can be omitted.

Figure 4A:
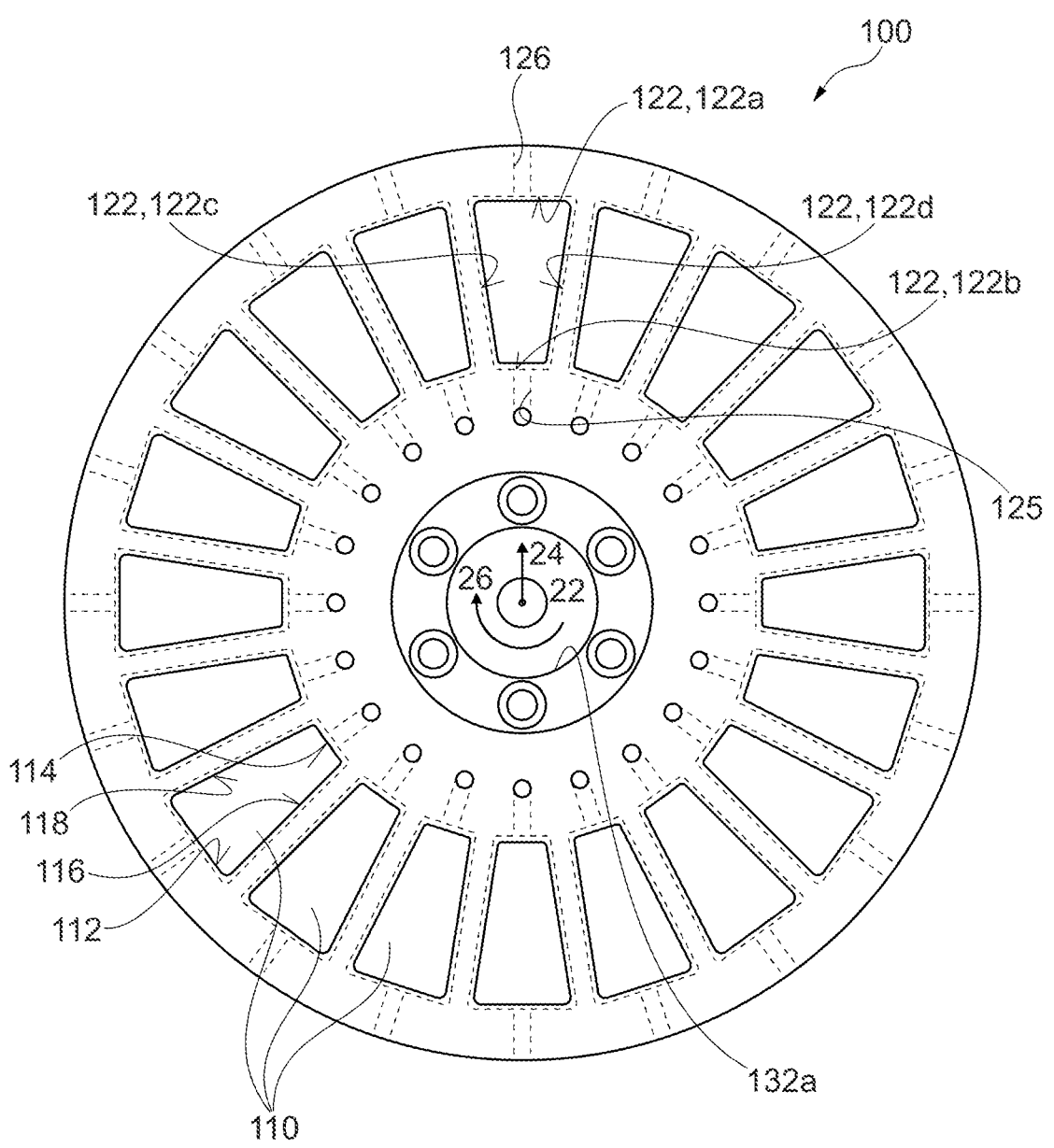
FIG. 4a shows the disk-shaped rotor plate of the rotor without inserted permanent magnets and without a holding structure in a view along an axial direction, wherein the grooves are schematically represented by dashed lines.
Figure 4B:
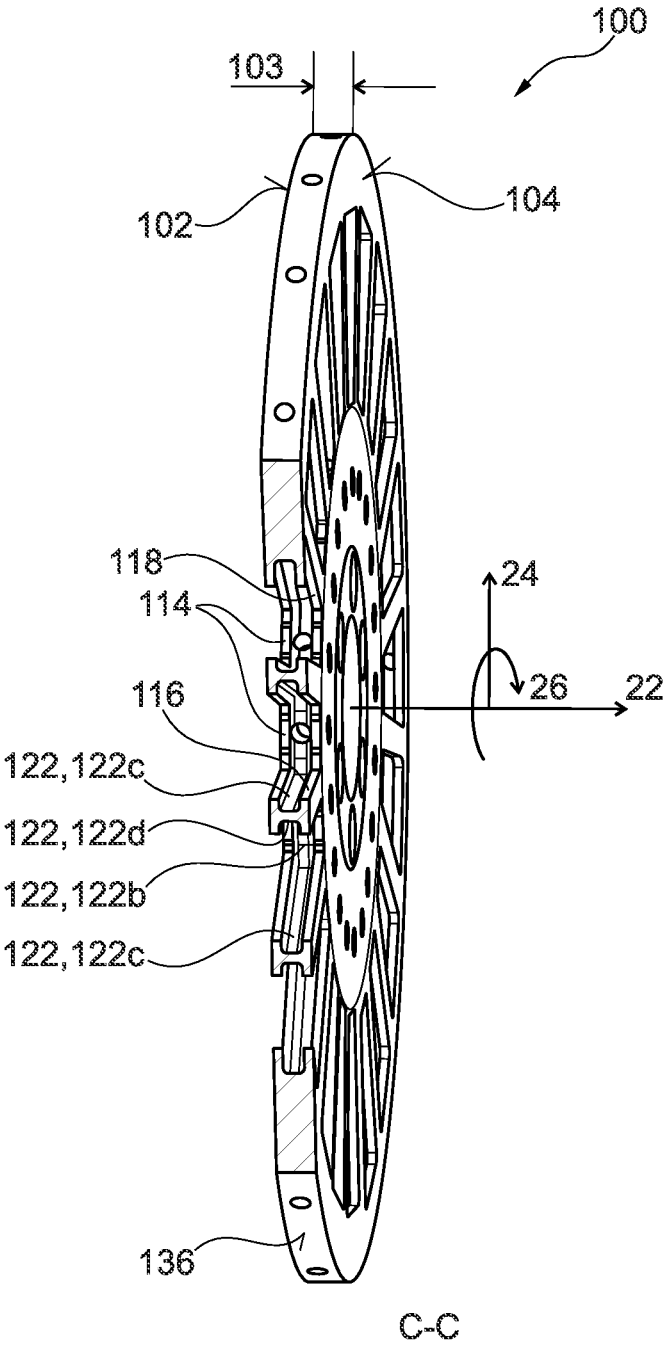
FIG. 4b shows the disk-shaped rotor plate from FIG. 4a in a perspective sectional illustration along section C-C from FIG. 3.

As is clearly apparent, in particular, in FIGS. 4a and 4b, the rotor plate 100 can have a first axial surface 102, a second, opposite axial surface 104 and an axial thickness 103 therebetween. Within the scope of this disclosure, an axial surface can be understood as a surface facing in a substantially axial direction 22. In other words, an axial surface can be understood as a surface that lies in a plane that is formed by the radial direction 24 and the circumferential direction 26. In the exemplary embodiment of FIGS. 4a and 4b, the magnet receptacles 110 are designed as through-windows or passages. In other words, the magnet receptacles 110 may extend axially through the entire axial thickness 103 of the rotor plate 100. That is to say that the magnet receptacles have openings in both axial surfaces 102, 104. In alternative refinements, the magnet receptacles 110 can be recessed into the first axial surface 102 and/or into the second axial surface 104 in the axial direction 22. In some refinements, the rotor plate 100 can have a substantially constant axial thickness 103. In refinements, the rotor plate 100 can be manufactured from a plate material. In particular, the disk-shaped rotor plate 100 can consist of one part and/or be produced from one part (particularly in comparison with rotor plates which are produced, for example, from a star-shaped first part and a ring-shaped second part). In other words, the disk-shaped rotor plate 100 can be produced in one piece. The corresponding magnet receptacles 110, grooves and channels as well as the further possible structures can have been produced from the plate material by methods which involve the removal of material. Manufacturability can thereby be substantially simplified. In refinements, the plate material can have a preset axial thickness. The preset axial thickness of the plate material can correspond to the axial thickness 103 of the disk-shaped rotor plate 100. It is thereby possible, for example, to provide the substantially constant axial thickness 103 of the disk-shaped rotor plate 100. As can be clearly seen in FIGS. 3 and 4a, the rotor plate 100 can have a central through-hole 132. The central through-hole 132 is designed to receive the shaft 70. The through-hole 132 defines an inner circumference 132a of the rotor plate 100. In addition, the rotor plate 100 has an outer circumference 136. In other words, the rotor plate 100 extends in the radial direction 24 between the inner circumference 132a and the outer circumference 136.

The rotor plate 100 is of disk-shaped or ring-shaped configuration. Disk- or ring-shaped can be understood to mean that a radial diameter dimension (diameter at the outer circumference 136) of the rotor 10 is a multiple of the axial thickness dimension of the rotor 10 (axial thickness 103). For example, the radial diameter dimension can be at least four times, in particular eight times and, in particular, ten times the axial thickness dimension. In embodiments, the ratio between the maximum diameter of the rotor 10 and the maximum axial thickness 103 of the rotor can be about 12+/−1. Furthermore, disk-shaped or ring-shaped can be understood, for example, as substantially round, in particular circular. As an alternative, disk-shaped can also comprise polygonal.

As can be clearly seen particularly in FIGS. 4a and 5a, the rotor plate 100 can comprise a plurality of shaft fastening holes 134. The shaft fastening holes 134 can be arranged radially inwardly of the magnet receptacles 110. The shaft fastening holes 134 can be distributed in the circumferential direction 26. In refinements, the shaft fastening holes 134 can extend through the rotor plate 100 in the axial direction 22. Via the shaft fastening holes 134, the rotor 10 can be fastened to the shaft 70 by means of a flange connection. This is illustrated schematically in FIG. 2. Optionally, the rotor 10 can further comprise a plurality of bushings 135 for this purpose (see, for example, FIG. 3). The plurality of bushings 135 can be arranged in the shaft fastening holes 134. In particular, the plurality of bushings 135 can be pressed into the shaft fastening holes 134. As an alternative or in addition to the bushings 135, one or more perforated disks can be provided. The perforated disk can be of ring-shaped design with a plurality of fastening holes, the fastening holes being aligned with corresponding shaft fastening holes 134 in the rotor plate 100. Alternatively, a plurality of individual perforated disks can be provided, which are each arranged so as to be aligned with a respective shaft fastening hole 134 in the rotor plate 100. In refinements, the sleeves and/or the one or more perforated disks can be manufactured from a metallic material, for example from steel. By means of the shaft fastening holes 134, a connection to the shaft 70 by means of a flange connection, in particular a flange screw connection, can be provided by nonpositive and/or positive engagement. As an alternative to the flange connection, the rotor 10 can be fastened, for example press-fitted, to the shaft 70 via the inner circumference 132a.

In particular with reference to FIGS. 3, 4a and 4b, it can be seen that the four inner side surfaces 112, 114, 116, 118 of the magnet receptacles 110 comprise a radially outer side surface 112, a radially inner side surface 114, a first lateral side surface 116 and a second lateral side surface 118. In particular, the four inner side surfaces 112, 114, 116, 118 form a peripheral wall surface of a respective magnet receptacle 110. As shown in the figures (see, for example, FIG. 4a), the radially outer side surface 112 and/or the radially inner side surface 114 can lie in a plane which is defined by the axial direction 22 and a direction tangential to the circumferential direction 26. In alternative refinements, the radially outer side surface 112 and/or the radially inner side surface 114 can lie in a plane which is defined by the axial direction 22 and the circumferential direction 26. In other words, the radially outer side surface 112 and/or the radially inner side surface 114 can be curved or straight. In refinements, the radially outer side surface 112 and/or the radially inner side surface 114 can be designed to be bent and/or inclined with respect to the axial direction 22. As illustrated in FIG. 4a, the radially outer side surface 112 can face inward substantially in the radial direction 24. As illustrated in FIG. 4a, the radially inner side surface 114 can face outward in the radial direction 24. In other words, the radially outer side surface 112 can be arranged opposite the radially inner side surface 114 in the radial direction 24. As shown, in particular, in FIG. 4a, the first lateral side surface 116 and the second lateral side surface 118 lie in a plane which is defined by the axial direction 22 and the radial direction 24. The first lateral side surface 116 can face in a first circumferential direction 26. The second lateral side surface 118 can face in a second circumferential direction 26, which is opposite to the first circumferential direction 26. In other words, the second lateral side surface 118 can be arranged opposite the first lateral side surface 116 in the circumferential direction 26. In particular, the magnet receptacles 110 are designed to be complementary to the permanent magnets 50.

As shown in the exemplary embodiment of FIGS. 4a, 4b, 5a, 5b, the first groove 122 can be introduced into all four inner side surfaces 112, 114, 116, 118. That is to say that, in this example, the first groove 122 is designed as a peripheral groove 122. In particular, the first groove 122 can have four groove portions 122a, 122b, 122c, 122d, which are recessed into the respective inner side surfaces 112, 114, 116, 118. A first groove portion 122a of the first groove 122 can be introduced into the radially outer side surface 112, in particular can be recessed into the radially outer side surface 112 in the radial direction. In the present example, the first groove portion 122a of the first groove 122 extends in the tangential direction along the radially outer side surface 112. In particular, depending on the configuration of the magnet receptacles 110, in particular of the radially outer side surface 112, the first groove portion 122a of the first groove 122 can also extend in a direction other than a tangential direction, for example in the circumferential direction 26. A second groove portion 122b of the first groove 122 can be introduced into the radially inner side surface 114, in particular can be recessed into the radially inner side surface 114 in the radial direction. In the present example, the second groove portion 122b of the first groove 122 extends in the tangential direction along the radially inner side surface 114. In particular, depending on the configuration of the magnet receptacles 110, in particular of the radially inner side surface 114, the second groove portion 122b of the first groove 122 can also extend in a direction other than a tangential direction, for example in the circumferential direction 26. A third groove portion 122c of the first groove 122 can be introduced into the first lateral side surface 116, in particular can be recessed into the first lateral side surface 116 in the circumferential direction. In the present example, the third groove portion 122c of the first groove 122 extends in the radial direction 24 along the first lateral side surface 116. In particular, depending on the configuration of the magnet receptacles 110, in particular of the first lateral side surface 116, the third groove portion 122c of the first groove 122 can also extend in a direction other than a radial direction 24, for example obliquely to a radial direction 24. A fourth groove portion 122d of the first groove 122 can be introduced into the second lateral side surface 118, in particular can be recessed into the second lateral side surface 118 in the circumferential direction. In the present example, the fourth groove portion 122d of the first groove 122 extends in the radial direction 24 along the second lateral side surface 118. In particular, depending on the configuration of the magnet receptacles 110, in particular of the second lateral side surface 118, the fourth groove portion 122d of the first groove 122 can also extend in a direction other than a radial direction 24, for example obliquely to a radial direction 24.

Even if the first groove 122 in the exemplary embodiment of FIGS. 4a, 4b, 5a, 5b is designed as a peripheral groove 122 which extends completely along the respective inner side surface 112, 114, 116, 118, it should be understood that this can be particularly advantageous for the holding of the permanent magnets 50. However, the first groove 122 may also extend only partially or completely in one or more of the four inner side surfaces 112, 114, 116, 118. This can lead, in particular, to production advantages. In this case, the second groove 124 in the respective permanent magnet 50 should be designed at least in one portion so as to be complementary to the first groove 122 in the magnet receptacle 110. That is to say that the first groove 122 and the second groove 124 should overlap in at least one portion, in particular orthogonally to the course of the respective groove 122, 124, in order to jointly form the channel portion 123 (see especially FIG. 5b, which shows such an overlap for the formation of the channel portion 123).

In advantageous refinements, as shown, in particular, in the examples of FIGS. 4b, 5b, the first groove 122 can be arranged axially centrally between the first axial surface 102 and the second axial surface 104. It is thereby possible to enable or, in particular, improve fixing of the permanent magnets 50 in both axial directions 22 by means of just one groove 122. Moreover, the stiffness of the rotor 10 can be improved compared to a groove 122 which is not axially central. In other refinements, it is also possible for the first groove 122 not to be arranged axially centrally. For example, the first groove 122 can be at an axial distance from the first axial surface 102 and/or the second axial surface 104.

As shown, in particular, in the exemplary embodiments of FIGS. 4b, 5a and 5b, the rotor 10 can furthermore comprise a filling channel 125 and a venting channel 126. The filling channel 125 and the venting channel 126 are connected to the first groove 122. In particular, the filling channel 125 and the venting channel 126 can extend radially centrally in a radially inward or outward direction 24 away from the magnet receptacle 110. It should be understood that filling channel 125 can also be used for venting and the venting channel 126 can also be used for filling the channel portion 123. In other words, the filling channel 125 can be referred to as a first channel 125 and the venting channel 126 can be referred to as a second channel 126. In the exemplary embodiment shown, the filling channel 125 comprises an axial depression, in particular an axial bore, and a radial depression, in particular a radial bore. The radial depression connects the first groove to the axial depression. The axial depression connects the radial depression to a surface of the disk-shaped rotor plate 100, in particular to at least one of the two axial surfaces 102, 104 (or both). In the exemplary embodiment illustrated, the venting channel 126 is designed as a radial depression or passage, in particular a radial bore, which leads from the outer circumference 136 of the rotor plate radially inward as far as the magnet receptacle 110. Even if a corresponding filling channel 125 and a venting channel 126 with a dedicated opening are formed for each of the magnet receptacles 110 in the figures, a plurality of filling channels 125 can comprise a common opening in refinements. In refinements, a plurality of venting channels 126 may comprise a common opening. Alternatively or in addition, it is also possible for just one of the first channel 125 and the second channel 126 to be provided in the rotor plate. Venting or filling can be implemented via a corresponding space or gap between the permanent magnet 50 and the magnet receptacle 110. As an alternative or in addition, the filling channel 125 and/or the venting channel 126 can also be embodied differently than depicted. In particular, the filling channel 125 and/or the venting channel 126 can comprise a radial bore and/or an axial bore. In refinements, the filling channel 125 and/or the venting channel 126 can extend, for example, directly away from the magnet receptacle 110 in the axial direction 22. In refinements, the filling channel 125 and/or the venting channel 126 can be arranged radially laterally on the magnet receptacle 110. The filling channel 125 and/or the venting channel 126 can be designed identically for all the magnet receptacles 110 or differently for one or more magnet receptacles 110. Even if the filling channel 125 and the venting channel 126 are illustrated as empty in FIGS. 4a, 4b, 5a, 5b, it should be understood that the two channels 125, 126 can be filled by the holding structure 60 (see, for example, FIG. 2). In refinements, the holding structure 60 can extend at least partially into the filling channel 125 and/or the venting channel 126. The filling channel 125 and the venting channel 126 serve to introduce, in particular to pour, a filler into the channel portion 123 during the production of the rotor 10, which filler forms the holding body 60 after production.

With reference, in particular, to FIGS. 3, 5a, 5b and 6, the permanent magnets 50 will be discussed in greater detail below. The permanent magnets 50 each have a first axial magnet surface 55a (also referred to as first axial surface 55a), a second axial magnet surface 55b (also referred to as second axial surface 55b) and an axial magnet thickness 55 between them. Within the scope of this disclosure, an axial magnet surface 55a, 55b can also be understood as a surface of the permanent magnet 50 which faces in a substantially axial direction 22. In other words, an axial magnet surface 55a, 55b can be understood as a surface that lies in a plane that is formed by the radial direction 24 and the circumferential direction 26. In other words, the first axial magnet surface 55a can be arranged parallel to and/or in the same orientation as the first axial surface 102 of the disk-shaped rotor plate 100. The second axial magnet surface 55b can be arranged parallel to and/or in the same orientation as the second axial surface 104 of the disk-shaped rotor plate 100. Although not absolutely necessary, the permanent magnets 50 can be arranged with the first axial surface 102 and/or the second axial surface 104 of the rotor plate 100, as shown in FIG. 5b. In particular, the maximum axial magnet thickness 55 of the permanent magnets 50 can correspond substantially to the maximum axial thickness 103 of the disk-shaped rotor plate 100. "Correspond substantially" can be understood to mean that the axial magnet thickness 55 is approximately 80% to 120%, in particular 90% to 110%, and preferably 95% to 105%, of the axial thickness 103 of the rotor plate 100.

As can best be seen in FIG. 3, the permanent magnets 50 are arranged in a manner distributed at equal intervals in the circumferential direction 26. In the illustrative embodiments in the drawings, twenty permanent magnets 50 are provided. In some embodiments, the number of permanent magnets 50 may be, for example, between 2 and 50, in particular between 6 and 40, more precisely between 10 and 30, and very particularly between 20+/−2.

The permanent magnets 50 can, in particular, be magnetized in the axial direction 22. In particular, the permanent magnets 50 can be magnetized alternately in opposite axial directions 22. In other words, the plurality of permanent magnets 50 can be alternately magnetized. That is to say that one permanent magnet 50 may be magnetized, for example, from its first axial surface 55a toward its second axial surface 55b, and an adjacent permanent magnet 50 may be magnetized from its second axial surface 55b toward its first axial surface 55a. The permanent magnets 50 can be configured in such a way that they each form at least one magnetic pole in the axial direction 22. The permanent magnets 50 can each be configured to form one-sided magnetic poles or two-sided magnetic poles. In particular, if a stator 80 is arranged on both sides of the rotor 10, the permanent magnets 50 can be configured to form two-sided magnetic poles, or permanent magnets 50 can be provided for each rotor side, as is familiar to a person skilled in the art. In refinements, the permanent magnets 50 can each be formed by a stack of magnetic plates which are stacked in the radial direction 24. This means that in each case a stack of magnetic plates forms a permanent magnet 50 which is magnetized axially, in particular which forms a two-sided magnetic pole.

As can best be seen in FIG. 5*a*, the permanent magnets 50 can have a trapezoidal shape in a plane which is defined by the radial direction 24 and the circumferential direction 26. In particular, the permanent magnets 50 can have an isosceles trapezoidal shape. In particular, the permanent magnets 50 can be designed to be complementary to the magnet receptacles 110. The permanent magnets 50 can be produced from a material comprising one or more of the elements neodymium, iron, boron, dysprosium, samarium and cobalt. In examples, the permanent magnets 50 can comprise NeFeB or SmCo. In some embodiments, the stack of laminated magnetic plates can be coated. In examples, the coating can comprise nickel and/or epoxy.

Figure 6:
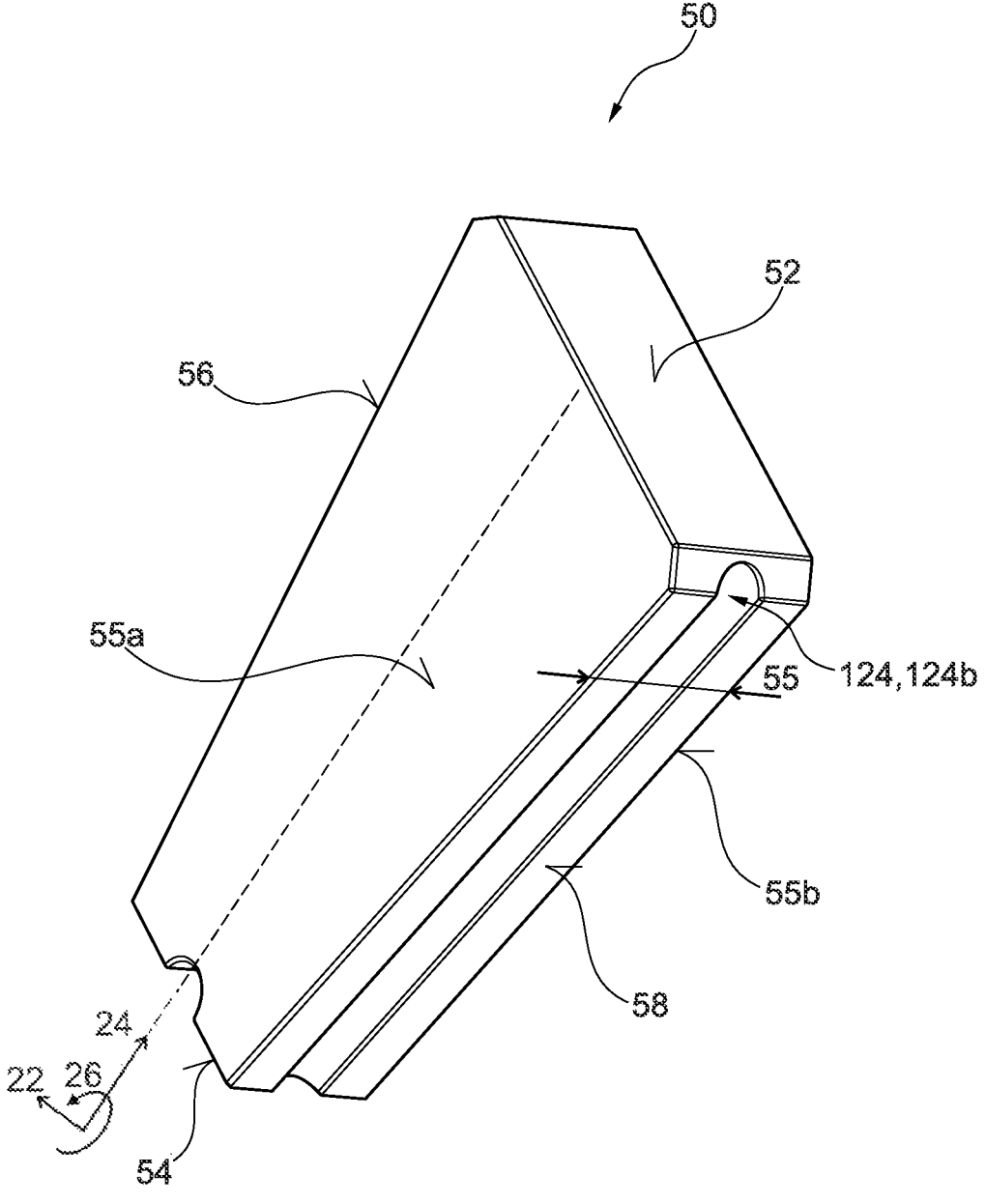
FIG. 6 shows an illustrative permanent magnet in a perspective view.

In particular, analogously to the first groove 122, the second groove 124 can be arranged axially centrally between the first axial magnet surface 55*a* and the second axial magnet surface 55*b* (see FIGS. 5*b* and 6). It is thereby possible to enable fixing of the permanent magnets 50 in both axial directions 22 by means of just one groove 124. Moreover, the stiffness of the rotor 10 can be improved compared to a groove 124 which is not axially central. In other refinements, it is also possible for the second groove 124 not to be arranged axially centrally, at least in part. For example, the second groove 124 can be at an axial distance from the first axial magnet surface 55*a* and/or the second axial magnet surface 55*b*.

In particular with reference to FIGS. 3 and 6, it can be seen that the four outer side surfaces 52, 54, 56, 58 of the permanent magnets 50 comprise a radially outer side surface 52, a radially inner side surface 54, a first lateral side surface 56 and a second lateral side surface 58. In particular, the four outer side surfaces 52, 54, 56, 58 form a peripheral side surface of a respective permanent magnet 50. As shown in the figures, the radially outer side surface 52 and/or the radially inner side surface 54 can lie in a plane which is defined by the axial direction 22 and a direction tangential to the circumferential direction 26. In alternative refinements, the radially outer side surface 52 and/or the radially inner side surface 54 can lie in a plane which is defined by the axial direction 22 and the circumferential direction 26. In other words, the radially outer side surface 52 and/or the radially inner side surface 54 can be curved or straight. In refinements, the radially outer side surface 52 and/or the radially inner side surface 54 can be designed to be bent and/or inclined with respect to the axial direction 22. The radially outer side surface 52 can face outward in the radial direction 24. The radially inner side surface 54 can face inward in the radial direction 24. In other words, the radially outer side surface 52 can be arranged opposite the radially inner side surface 54 in the radial direction 24. As illustrated in FIGS. 5*b* and 6, the first lateral side surface 56 and the second lateral side surface 58 can lie in a plane which is defined by the axial direction 22 and the radial direction 24. The first lateral side surface 56 can face in a first circumferential direction 26. The second lateral side surface 58 can face in a second circumferential direction 26, which is opposite to the first circumferential direction 26. In other words, the second lateral side surface 58 can be arranged opposite the first lateral side surface 56 in the circumferential direction 26. In particular, the outer side surfaces 52, 54,

56, 58 of the permanent magnets 50 can be designed to be complementary to the inner side surfaces 112, 114, 116, 118 of the magnet receptacles 110, thus enabling the permanent magnets 50 to be arranged in the magnet receptacles 110.

As can be seen in the exemplary embodiment of FIGS. 5*a*, 5*b* and 6, the second groove 124 can be introduced into the first lateral side surface 56 and into the second lateral side surface 58. In particular, the second groove 124 can comprise two groove portions 124*a*, 124*b*, wherein a first groove portion 124*a* is formed in the first lateral side surface 56 and a second groove portion 124*b* is formed in the second lateral side surface 58. Thus, the two groove portions 124*a*, 124*b* of the second groove 124, together with the two groove portions 122*c*. 122*d* of the first groove 122, jointly form the channel portion 123 for fixing the permanent magnets 50 by means of the holding body 60 arranged therein. To be more precise, the groove portions 122*c*, 122*d*, 124*a*, 124*b* form two channel portions 123 in the exemplary embodiment shown. The first groove portion 124*a* of the second groove 124, together with the third groove portion 122*c* of the first groove 122, forms a first channel portion 123. The second groove portion 124*b* of the second groove 124, together with the fourth groove portion 122*d* of the first groove 122, forms a second channel portion 123.

The second groove 124 can be recessed into the first lateral side surface 56 and/or the second lateral side surface 58, in particular in the circumferential direction 26. The second groove 124 can extend along the first lateral side surface 56 and/or the second lateral side surface 58, in particular in the radial direction 24.

Even if, in the exemplary embodiment of FIGS. 5*a*, 5*b* and 6, the second groove 122 is introduced into the first lateral side surface 56 and into the second lateral side surface 58, it is also possible, in other refinements, for the second groove 122 to extend only partially or completely in one or more of the four outer side surfaces 52, 54, 56, 58. This can lead, in particular, to production advantages. In this case, the second groove 124 in the respective permanent magnet 50 should be designed at least in one portion so as to be complementary to the first groove 122 in the magnet receptacle 110. That is to say that the first groove 122 and the second groove 124 should overlap in at least one portion, in particular orthogonally to the course of the respective groove 122, 124, in order to jointly form the channel portion 123 (see especially FIG. 5*b*, which shows such an overlap for the formation of the channel portion 123). In refinements, the second groove 124 can also be configured as a peripheral groove and can be introduced into all four outer side surfaces 52, 54, 56, 58.

Each permanent magnet 50 can extend along a radial length from a radially inner end on the radially inner side surface 54 to a radially outer end on the radially outer side surface 52 of the permanent magnet 50. In particular, a circumferential width, that is to say a dimension of the permanent magnet in the circumferential direction 26, of a permanent magnet 50 can be smaller at the radially inner end than at the radially outer end.

As can be seen, in particular, from FIG. 5*b*, at least one of the four outer side surfaces 52, 54, 56, 58 of the permanent magnets 50 can be in contact with at least one of the four inner side surfaces 112, 114, 116, 118 of the magnet receptacles 110. In particular, the outer side surfaces 52, 54, 56, 58 of the permanent magnets 50 can be in contact with the respective inner side surfaces 112, 114, 116, 118. In other words, for example, the radially outer side surface 52 of the permanent magnet 50 can be in contact with the radially outer side surface 112 of the magnet receptacle 110.

The holding structure 60 can be produced, in particular, by pouring a filler into the channel portion 123. To be more precise, the holding structure 60 can be produced by pouring a filler through the filling channel 125 in the channel portion 123. In refinements, the rotor plate 100 can be produced from a first material and the holding structure 60 can be produced from a second material. In particular, the first material and/or the second material can be a non-metallic material. In refinements, the first material and the second material can be different materials and/or can have different properties. In refinements, the first material can comprise a composite material. In particular, the first material can comprise a fiber-reinforced plastic material. In particular, the first material can comprise a glass- and/or carbon-fiber-reinforced matrix material. The matrix material can be, in particular, a thermosetting plastic such as, for example, epoxy resin. In particular, the fiber reinforcement can comprise continuous fibers. In refinements, the second material can comprise a thermoplastic material. In refinements, the second material can comprise a fiber-reinforced material, in particular without continuous fibers. In some refinements, the second material can comprise an adhesive material.

Figure 7:
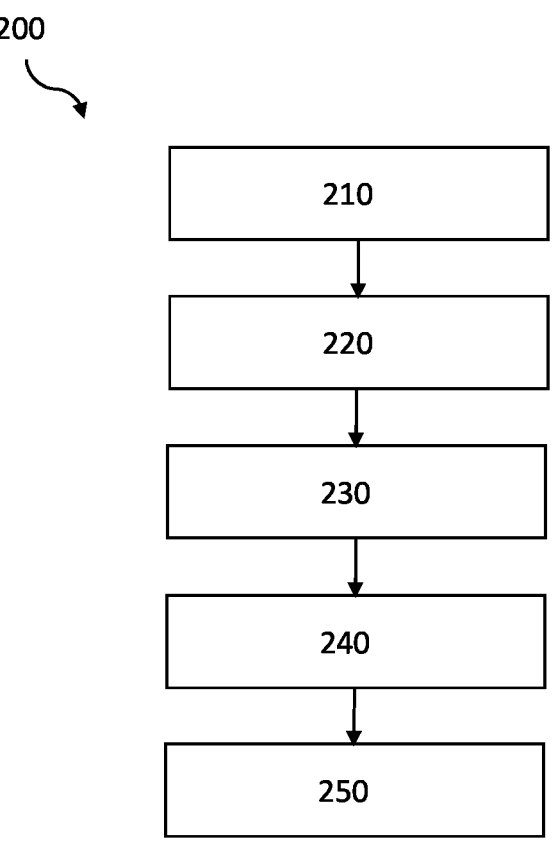
FIG. 7 schematically shows a flow chart of a method for producing a rotor for an axial flux motor.

FIG. 7 schematically shows the method 200 for producing a rotor 10 for an axial flux motor 1. In particular, the method for producing the rotor 10 can be designed in accordance with any one of the preceding refinements.

The method comprises the following steps. Providing 210 a disk-shaped rotor plate 100 having a plurality of magnet receptacles 110, wherein a first groove 122 is introduced into each of the magnet receptacles 110. Providing 220 a plurality of permanent magnets 50 into each of which a second groove 124 is introduced. Inserting 230 a respective permanent magnet 50 into a respective magnet receptacle 110 in such a way that the first groove 122 and the second groove 124 jointly form a channel portion 123. Holding 240 the permanent magnets 50 in the magnet receptacles 110. Introducing 250 a filler material into the channel portion 123, thereby forming a holding body 60 for fixing the permanent magnets 50 in the magnet receptacles 110.

In refinements of the method, the plurality of magnet receptacles 110 can be introduced mechanically into the disk-shaped rotor plate 100. In particular, the plurality of magnet receptacles 110 can be introduced into the disk-shaped rotor plate 100 by machining (e.g. milling).

In refinements of the method, the plurality of magnet receptacles 110 can be introduced axially as through-receptacles into the disk-shaped rotor plate 100.

In refinements of the method, the first groove 122 can be introduced into the disk-shaped rotor plate 100 mechanically. In particular, the first groove 122 can be introduced into the disk-shaped rotor plate 100 by machining (e.g. milling).

In refinements of the method, a filling channel 125 and/or a venting channel 126 can furthermore be introduced into the disk-shaped rotor plate 100. The filling channel 125 and/or the venting channel 126 can be fluidically connected to or brought into fluidic connection with the first groove 122. In refinements, the filling channel 125 and/or the venting channel 126 can be introduced mechanically into the disk-shaped rotor plate 100. In particular, the filling channel 125 and/or the venting channel 126 can be introduced into the disk-shaped rotor plate 100 by machining. In some refinements, the filling channel 125 and/or the venting channel 126 can be introduced, by drilling for example, in the radial direction 24 and/or in the axial direction 22, into the disk-shaped rotor plate 100. In refinements, the filler material can be introduced into the channel portion 123 via the filling channel 125.

In refinements of the method, the filler material can be introduced into the channel portion 123 under counterpressure. This makes it possible, in particular, to achieve a reduction in the shrinkage during cooling and, as a result, an increase in the filling factor in the channel portion 123.

In refinements of the method, the filler material can be poured or injected into the channel portion 123. For example, the filler material can be poured or injected via individual injection points in the rotor plate 100 for the respective channel portion 123 or via one or more injection points for a plurality of channel portions 123. In other words, it is possible, for example, to provide a single injection opening in the rotor body 100, which is fluidically connected to the channel portions 123 via a plurality of branches. In refinements of the method, the filler material can comprise a thermoplastic material. After curing, the filler material can form the holding structure 60. Alternatively or in addition, the filler material can comprise adhesive material and/or fiber-reinforced material.

In refinements of the method, the permanent magnets 50 can be held in the magnet receptacles 110 during the introduction 250 of the filler material. In refinements, the permanent magnets 50 can be held axially in the magnet receptacles 110. In refinements, the permanent magnets 50 and the rotor plate 100 are inserted, in particular centered and/or inserted in the axial direction 22, into a first mold. In refinements, a second mold is placed in the axial direction 22 onto the rotor plate 100 with the permanent magnets 50 inserted therein. In refinements, the permanent magnets 50 are held in the magnet receptacles 110 by the two molds.

Although the present invention has been described above and is defined in the appended claims, it should be understood that the invention may alternatively also be defined in accordance with the following embodiments:

1. A rotor (10) for an axial flux motor (1), comprising:
   a disk-shaped rotor plate (100) having a plurality of magnet receptacles (110), which are distributed in the circumferential direction (26) and introduced into the rotor plate (100) in the axial direction (22), wherein the magnet receptacles (110) are each defined by four inner side surfaces (112, 114, 116, 118) of the rotor plate (100),
   a plurality of permanent magnets (50), which are arranged in the magnet receptacles (110) and are each defined by four outer side surfaces (52, 54, 56, 58),
   wherein a first groove (122) is introduced into at least one of the inner side surfaces (112, 114, 116, 118),
   wherein a second groove (124) is introduced into at least one of the outer side surfaces (52, 54, 56, 58), and
   wherein the first and the second groove (122, 124) are arranged and formed in such a way that they jointly form a channel portion (123) in which a holding structure (60) for fixing the permanent magnets (50) in the rotor plate (100) is arranged.

2. The rotor (10) in accordance with embodiment 1, wherein the rotor plate (100) has a first axial surface (102), a second, opposite axial surface (104) and an axial thickness (103) therebetween.

3. The rotor (10) in accordance with embodiment 2, wherein the first groove (122) is at a distance from the first axial surface (102) and the second axial surface (104).

4. The rotor (10) in accordance with either of embodiments 2 or 3, wherein the first groove (122) is arranged axially centrally between the first axial surface (102) and the second axial surface (104).

5. The rotor (10) in accordance with any one of embodiments 2 to 4, wherein the rotor plate (100) has a substantially constant axial thickness (103).

6. The rotor (10) in accordance with any one of the preceding embodiments, wherein the permanent magnets (50) each have a first axial magnet surface (55*a*), a second axial magnet surface (55*b*), and an axial magnet thickness (55) therebetween.

7. The rotor (10) in accordance with embodiment 6, wherein the second groove (124) is at a distance from the first axial magnet surface (55*a*) and the second axial magnet surface (55*b*).

8. The rotor (10) in accordance with either of embodiments 6 or 7, wherein the second groove (124) is arranged axially centrally between the first axial magnet surface (55*a*) and the second axial magnet surface (55*b*).

9. The rotor (10) in accordance with any one of embodiments 6 to 8, if at least dependent on embodiment 2, wherein the axial magnet thickness (55) of the permanent magnets (50) substantially corresponds to the axial thickness (103) of the rotor plate (100).

10. The rotor (10) in accordance with any one of the preceding embodiments, wherein the permanent magnets (50) are magnetized in the axial direction (22).

11. The rotor (10) in accordance with any one of the preceding embodiments, wherein the permanent magnets (50) are each formed by a stack of magnetic plates which are stacked in the radial direction (24).

12. The rotor (10) in accordance with any one of the preceding embodiments, wherein the permanent magnets (50) have a trapezoidal shape in a plane which is defined by the radial direction (24) and the circumferential direction (26).

13. The rotor (10) in accordance with any one of the preceding embodiments, wherein the four inner side surfaces (112, 114, 116, 118) of the magnet receptacles (110) comprise a radially outer side surface (112), a radially inner side surface (114), a first lateral side surface (116) and a second lateral side surface (118).

14. The rotor (10) in accordance with embodiment 13, wherein the first groove (122) is introduced at least into the first lateral side surface (116) and/or the second lateral side surface (118).

15. The rotor (10) in accordance with either of embodiments 13 or 14, wherein the first groove (122) is introduced at least into the radially outer side surface (112) and/or into the radially inner side surface (114).

16. The rotor (10) in accordance with any one of embodiments 13 to 15, wherein the first groove (122) is formed as a peripheral groove and is introduced into all four inner side surfaces (112, 114, 116, 118).

17. The rotor (10) in accordance with any one of the preceding embodiments, wherein the four outer side surfaces (52, 54, 56, 58) of the permanent magnets (50) comprise a radially outer side surface (52), a radially inner side surface (54), a first lateral side surface (56) and a second lateral side surface (58).

18. The rotor (10) in accordance with embodiment 17, wherein the second groove (124) is introduced at least into the first lateral side surface (56) and/or the second lateral side surface (58).

19. The rotor (10) in accordance with either of embodiments 17 or 18, wherein the second groove (124) is introduced at least into the radially outer side surface (52) and/or into the radially inner side surface (54).

20. The rotor (10) in accordance with any one of the preceding embodiments, wherein at least one of the four outer side surfaces (52, 54, 56, 58) of the permanent magnets (50) is in contact with at least one of the four inner side surfaces (112, 114, 116, 118) of the magnet receptacles (110).

21. The rotor (10) in accordance with any one of the preceding the embodiments, wherein the first groove (122) is connected to at least one filling channel (125) and/or one venting channel (126), which are introduced into the rotor plate (100).

22. The rotor (10) in accordance with embodiment 21, wherein the holding structure (60) extends at least partially into the filling channel (125) and/or the venting channel (126).

23. The rotor (10) in accordance with any one of the preceding embodiments, wherein the holding structure (60) is formed by pouring a filler into the channel portion (123).

24. The rotor (10) in accordance with either of embodiments 21 or 22, wherein the holding structure (60) is produced by pouring a filler into the channel portion (123) through the filling channel (125).

25. The rotor (10) in accordance with any one of the preceding embodiments, wherein the holding structure (60) is arranged in the channel portion (123) in such a way that the permanent magnets (50) are fixed in the rotor plate (100) by the holding structure (60) at least by positive engagement.

26. The rotor (10) in accordance with any one of the preceding embodiments, wherein the permanent magnets (50) are fixed axially by the holding structure (60).

27. The rotor (10) in accordance with any one of the preceding embodiments, wherein the rotor plate (100) is produced from a first material and the holding structure (60) is produced from a second material.

28. The rotor (10) in accordance with embodiment 27, wherein the first material comprises a composite material, in particular a fiber-reinforced plastic material.

29. The rotor (10) in accordance with either of embodiments 27 or 28, wherein the second material comprises a thermoplastic material.

30. The rotor (10) in accordance with any one of the preceding embodiments, wherein the rotor plate (100) is manufactured from a plate material.

31. The rotor (10) in accordance with any one of the preceding embodiments, wherein the rotor plate (100) has a central through-hole (132).

32. The rotor (10) in accordance with any one of the preceding embodiments, wherein the rotor plate (100) comprises a plurality of shaft fastening holes (134), which are arranged radially inwardly of the magnet receptacles (110).

33. The rotor (10) in accordance with embodiment 32, further comprising a plurality of bushings (135), in which shaft fastening holes (134) are arranged, in particular press-fitted.

34. An axial flux motor (1) for a fan (2), comprising:
   a motor housing (90),
   a shaft (70) rotatably mounted in the motor housing (90),
   at least one stator (80), which is arranged in the motor housing (90), and at least one rotor (10) in accordance with any one of the preceding embodiments, wherein the rotor (10) is arranged axially adjacent to the stator (80) and for conjoint rotation on the shaft (70) in the motor housing (90).

35. The axial flux motor (1) in accordance with embodiment 34, comprising two stators (80), wherein the rotor (10) is arranged axially between the two stators (80).

36. The axial flux motor (1) in accordance with either of embodiments 34 or 35, wherein the axial flux motor (1) is formed as a high-voltage axial flux motor for a high-voltage fan (3) of an electric vehicle.

37. A high-voltage fan (1), comprising:
   an axial flux motor (1) in accordance with any one of embodiments 34 to 36, and
   a fan impeller (2) which is arranged for conjoint rotation on the shaft (70), outside of the motor housing (90).

38. A method (200) for producing a rotor (10) for an axial flux motor (1), comprising:
   providing (210) a disk-shaped rotor plate (100) having a plurality of magnet receptacles (110), wherein a first groove (122) is introduced into each of the magnet receptacles (110), providing (220) a plurality of permanent magnets (50) into each of which a second groove (124) is introduced,
   inserting (230) a respective permanent magnet (50) into a respective magnet receptacle (110) in such a way that the first groove (122) and the second groove (124) jointly form a channel portion (123),
   holding (240) the permanent magnets (50) in the magnet receptacles (110), and introducing (250) a filler material into the channel portion (123), thereby forming a holding body (60) for fixing the permanent magnets (50) in the magnet receptacles (110).

39. The method (200) in accordance with embodiment 38, wherein the plurality of magnet receptacles (110) are introduced into the disk-shaped rotor plate (100) mechanically, in particular by machining.

40. The method (200) in accordance with either of embodiments 38 or 39, wherein the plurality of magnet receptacles (110) are introduced axially as through-receptacles into the disk-shaped rotor plate (100).

41. The method (200) in accordance with any one of embodiments 38 to 40, wherein the first groove (122) is introduced into the disk-shaped rotor plate (100) mechanically, in particular by machining.

42. The method (200) in accordance with any one of embodiments 38 to 41, wherein furthermore a filling channel (125) and/or a venting channel (126), which are/is fluidically connected to the first groove (122), are/is introduced into the disk-shaped rotor plate (100).

43. The method (200) in accordance with embodiment 38, wherein the filling channel (125) and/or the venting channel (126) are/is introduced into the disk-shaped rotor plate (100) mechanically, in particular by machining.

44. The method (200) in accordance with either of embodiments 42 or 43, wherein the filler material is introduced into the channel portion (123) via the filler channel (125).

45. The method (200) in accordance with any one of embodiments 38 to 44, wherein the filler material is introduced into the channel portion (123) under counterpressure.

46. The method (200) in accordance with any one of embodiments 38 to 45, wherein the filler material is poured or injected into the channel portion (123).

47. The method (200) in accordance with any one of embodiments 38 to 46, wherein the filler material comprises a thermoplastic material, which forms the holding structure (60) after curing.

48. The method (200) in accordance with any one of embodiments 38 to 47, wherein the permanent magnets (50) are held in the magnet receptacles (110) during the introduction (250) of the filler material.

49. The method (200) in accordance with any one of embodiments 38 to 48, wherein the permanent magnets (50) are held axially in the magnet receptacles (110).

50. The method (200) in accordance with any one of embodiments 38 to 49, wherein the rotor (10) is produced in accordance with any one of embodiments 1 to 33.

The invention claimed is:

1. A rotor (10) for an axial flux motor (1), comprising:
   a disk-shaped rotor plate (100) having a plurality of magnet receptacles (110), which are distributed in the circumferential direction (26) and introduced into the rotor plate (100) in the axial direction (22), wherein the disk-shaped rotor plate (100) is one-piece, wherein the magnet receptacles (110) are introduced into the disk-shaped rotor plate (100) mechanically and are each defined by four inner side surfaces (112, 114, 116, 118) of the rotor plate (100), and
   a plurality of permanent magnets (50), which are arranged in the magnet receptacles (110) and are each defined by four outer side surfaces (52, 54, 56, 58),
   wherein a first groove (122) is introduced into at least one of the inner side surfaces (112, 114, 116, 118) of a magnet receptacle (110),
   wherein a second groove (124) is introduced into at least one of the outer side surfaces (52, 54, 56, 58) of a permanent magnet (50),
   wherein the first and the second groove (122, 124) are arranged and designed in such a way that they jointly form a channel portion (123),
   wherein a filling channel (125) with an opening is mechanically introduced into the rotor plate (100),
   wherein the filling channel (125) is fluidically connected with the channel portion (123), and
   wherein a holding structure (60) for fixing the permanent magnets (50) in the rotor plate (100) is produced by introducing a filler material into the channel portion (123) via the opening of the filling channel (125) such that filler material flows into the channel portion portion (123) and subsequently hardens.

2. The rotor (10) as claimed in claim 1, wherein the rotor plate (100) has a first axial surface (102), a second, opposite axial surface (104) and an axial thickness (103) between the first axial surface (102) and the second axial surface (104).

3. The rotor (10) as claimed in claim 2, wherein the first groove (122) is at a distance from the first axial surface (102) and the second axial surface (104).

4. The rotor (10) as claimed in claim 1, wherein the permanent magnets (50) each have a first axial magnet surface (55*a*), a second axial magnet surface (55*b*), and an axial magnet thickness (55) between the first axial magnet surface (55*a*) and the second axial magnet surface (55*b*).

5. The rotor (10) as claimed in claim 4, wherein the second groove (124) is at a distance from the first axial magnet surface (55*a*) and the second axial magnet surface (55*b*).

6. The rotor (10) as claimed in claim 1, wherein the four inner side surfaces (112, 114, 116, 118) of the magnet receptacles (110) comprise a radially outer side surface (112), a radially inner side surface (114), a first lateral side surface (116) and a second lateral side surface (118), and wherein the first groove (122) is introduced into at least one of the first lateral side surface (116), the second lateral side surface (118), the radially outer side surface (112) and the radially inner side surface (114).

7. The rotor (10) as claimed in claim 1, wherein the four outer side surfaces (52, 54, 56, 58) of the permanent magnets (50) comprise a radially outer side surface (52), a radially inner side surface (54), a first lateral side surface (56) and a second lateral side surface (58), and wherein the second groove (124) is introduced into at least one of the first lateral side surface (56), the second lateral side surface (58), the radially outer side surface (52) and the radially inner side surface (54).

8. The rotor (10) as claimed in claim 1, wherein at least one of the four outer side surfaces (52, 54, 56, 58) of the permanent magnets (50) is in contact with at least one of the four inner side surfaces (112, 114, 116, 118) of the magnet receptacles (110).

9. The rotor (10) as claimed in claim 1, wherein the first groove (122) is connected to at least one of the filling channel (125) and a venting channel (126), which are introduced into the rotor plate (100).

10. The rotor (10) as claimed in claim 1, wherein the holding structure (60) is formed by pouring or injecting a filler material into the channel portion (123).

11. The rotor (10) as claimed in claim 1, wherein the holding structure (60) is arranged in the channel portion (123) in such a way that the permanent magnets (50) are fixed in the rotor plate (100) by the holding structure (60) at least by positive engagement.

12. The rotor (10) as claimed in claim 1, wherein the permanent magnets (50) are fixed axially by the holding structure (60).

13. The rotor (10) as claimed in claim 1, wherein the rotor plate (100) is produced from a first material and the holding structure (60) is produced from a second material.

14. The rotor (10) as claimed in claim 13, wherein the first material comprises a composite material.

15. The rotor (10) as claimed in claim 13, wherein the second material comprises a thermoplastic material.

16. An axial flux motor (1) for a fan (2), comprising:
a motor housing (90),
a shaft (70) rotatably mounted in the motor housing (90),
at least one stator (80), which is arranged in the motor housing (90), and
at least one rotor (10) as claimed in claim 1, wherein the rotor (10) is arranged axially
adjacent to the stator (80) and is adapted for conjoint rotation on the shaft (70) in the motor housing (90).

17. A high-voltage fan (1), comprising:
an flux axial flux motor (1) as claimed in claim 16, and
a fan impeller (2) which is arranged for conjoint rotation on the shaft (70), outside of the motor housing (90).

18. The rotor (10) as claimed in claim 1, wherein the filling channel (125) comprises an axial depression and a radial depression, wherein the radial depression connects the first groove (122) to the axial depression, and wherein the axial depression connects the radial depression to at least one surface (102, 104) of the disk-shaped rotor plate (100).

19. A method (200) for producing a one-piece rotor (10) for an axial flux motor (1), comprising:
providing (210) a one-piece disk-shaped rotor plate (100) having a plurality of magnet receptacles (110), wherein the plurality of magnet receptacles (110) are introduced into the disk-shaped rotor plate (110) mechanically, wherein a first groove (122) is introduced into each of the magnet receptacles (110) mechanically, wherein an injection opening is mechanically formed in the rotor plate (100),
providing (220) a plurality of permanent magnets (50) into each of which a second groove (124) is introduced,
inserting (230) a respective permanent magnet (50) into a respective magnet receptacle (110) in such a way that the first groove (122) and the second groove (124) jointly form a channel portion (123) fluidically connected with the injection opening,
holding (240) the permanent magnets (50) in the magnet receptacles (110),
introducing (250) a filler material into the channel portion (123) via the injection opening, whereby filler material flows from the injection opening into the channel portion (123), and
hardening the filler material, thereby forming a holding body (60) for fixing the permanent magnets (50) in the magnet receptacles (110).

20. A rotor (10) for an axial flux motor (1), comprising:
a disk-shaped rotor plate (100) having a plurality of magnet receptacles (110), which are distributed in the circumferential direction (26) and introduced into the rotor plate (100) in the axial direction (22), wherein the disk-shaped rotor plate (100) is one-piece, wherein the magnet receptacles (110) are introduced into the disk-shaped rotor plate (100) mechanically and are each defined by four inner side surfaces (112, 114, 116, 118) of the rotor plate (100), and
a plurality of permanent magnets (50), which are arranged in the magnet receptacles (110) and are each defined by four outer side surfaces (52, 54, 56, 58),
wherein a first groove (122) is introduced into at least one of the inner side surfaces (112, 114, 116, 118) of a magnet receptacle (110),
wherein a second groove (124) is introduced into at least one of the outer side surfaces (52, 54, 56, 58) of a permanent magnet (50),
wherein the first and the second groove (122, 124) are arranged and designed in such a way that they jointly form a channel portion (123),
wherein at least one of the four outer side surfaces (52, 54, 56, 58) of the permanent magnets (50) is in contact with at least one of the four inner side surfaces (112, 114, 116, 118) of the magnet receptacles (110), and
wherein a holding structure (60) for fixing the permanent magnets (50) in the rotor plate (100) is produced by introducing a filler material into the channel portion (123) and hardening the filler material.

\*    \*    \*    \*    \*